(12) United States Patent
Hossain et al.

(10) Patent No.: US 8,971,903 B2
(45) Date of Patent: Mar. 3, 2015

(54) TECHNIQUES FOR MANAGING COMMUNICATIONS RESOURCES FOR A MOBILE DEVICE

(75) Inventors: Asif Hossain, San Jose, CA (US); Janell Paulson, Carlsbad, CA (US); Vincent Arcelo, Gilroy, CA (US); Anand Kashikar, Bangalore (IN); Nitin Kumar, San Ramon, CA (US); Nash Raghavan, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 12/879,934

(22) Filed: Sep. 10, 2010

(65) Prior Publication Data

US 2012/0122461 A1    May 17, 2012

(51) Int. Cl.
*H04W 72/04*    (2009.01)
*H04W 72/08*    (2009.01)

(52) U.S. Cl.
CPC ............................. *H04W 72/085* (2013.01)
USPC .......................................... 455/450; 370/328

(58) Field of Classification Search
USPC .......................... 455/450; 370/252, 328, 338
See application file for complete search history.

(56) References Cited

U.S. PATENT DOCUMENTS

| | | | |
|---|---|---|---|
| 6,711,129 B1 * | 3/2004 | Bauer et al. .................... | 370/230 |
| 2004/0147262 A1 * | 7/2004 | Lescuyer et al. ............... | 455/434 |
| 2007/0147317 A1 * | 6/2007 | Smith et al. .................... | 370/338 |
| 2008/0117860 A1 * | 5/2008 | Rodriguez et al. ............ | 370/328 |

* cited by examiner

*Primary Examiner* — Myron K Wyche
(74) *Attorney, Agent, or Firm* — Kilpatrick Townsend & Stockton LLP

(57) ABSTRACT

Techniques to manage communications resources for a mobile device are described. An apparatus may comprise a mobile computing device having a radio arranged to communicate information over a wireless link, a link classifier arranged to generate a class parameter for the wireless link based on signal quality measurements of the wireless link, and a data service manager arranged to receive a data service request from an application, determine whether the application may communicate information over the wireless link based on the class parameter for the wireless link, and generate a control directive for the application granting or denying the data service request. Other embodiments are described and claimed.

17 Claims, 8 Drawing Sheets

TECHNIQUES FOR MANAGING COMMUNICATIONS RESOURCES FOR A MOBILE DEVICE

BACKGROUND

Mobile computing devices, such as smart phones, have become highly capable communication devices in recent years. In addition to the wide array of processing capabilities such as digital assistant (PDA) features, including word processing, spreadsheets, synchronization of information (e.g., email) with a desktop computer, and so forth, mobile computing devices also typically include wireless communications capabilities to provide features, such as mobile telephony, mobile email access, web browsing, and content (e.g., video and radio) reception. Exemplary wireless communications technologies include cellular, satellite, and mobile data networking technologies.

In order to provide communication functionality, the device may need to search for and maintain multiple types of wireless signal connections. Signal quality for a given wireless connection may dynamically vary based on environmental conditions and movement of a device. Further, different wireless connections require different amounts of battery power and may consume battery power at different rates. At the same time, different types of wireless activity may operate at different data rates (or throughput), and/or may consume battery power at different rates. Accordingly, there may be a need for an improved apparatus and methods for providing enhanced power savings while maintaining communication services.

DETAILED DESCRIPTION

Figure 1:
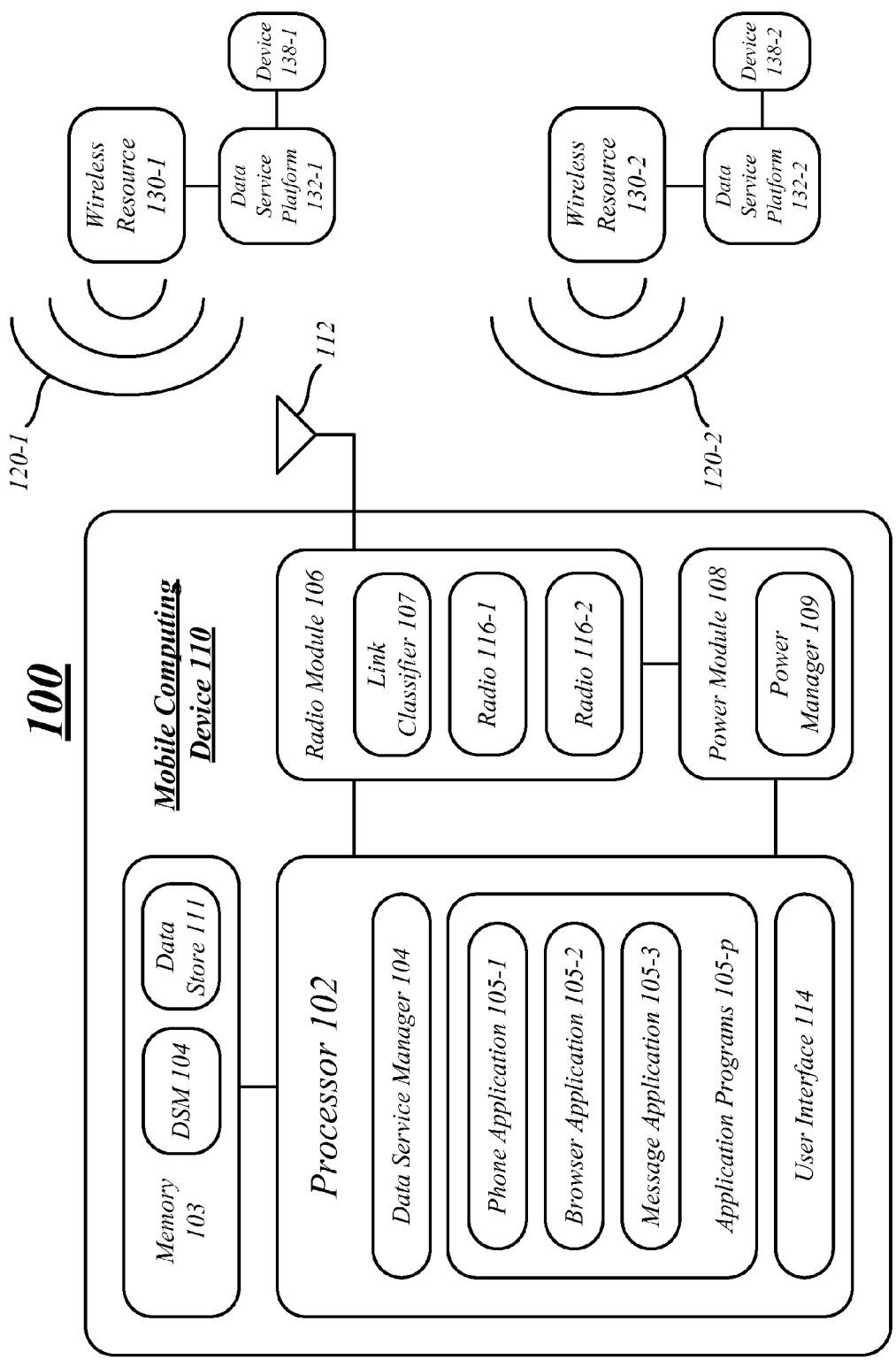
FIG. 1 illustrates one embodiment of a first mobile computing device.

Various embodiments are generally directed to techniques to provide enhanced data service management for a mobile computing device, such as a smart phone, for example. The enhanced data service management techniques may control and manage access to communication resources provided by a smart phone by various components or elements implemented by the smart phone. Intelligent management of communications resources provides significant technical advantages, including extending battery life and enhancing user experience, among others.

By way of example and not limitation, various embodiments describe enhanced data service management techniques to control and manage access to communication resources of a smart phone by different software applications implemented for the smart phone. However, it may be appreciated that the enhanced data service management techniques may control and manage access to communication resources of a smart phone on behalf of any hardware elements, software elements, or a combination of both, as implemented for the smart phone. Examples of hardware elements may include without limitation logic devices, microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments are particularly directed to techniques to dynamically manage data rates for one or more wireless links based on a signal quality of the one or more wireless links. For instance, a data service manager may control access to one or more radios of a mobile computing device by different applications based on a signal quality for any wireless links maintained by the wireless radios. Further, a data service manager may control use of one or more radios of a mobile computing device by allocating data rates for different applications based on a signal quality for any wireless links maintained by the wireless radios. As a signal quality for a wireless link varies, so does a level of access and a given data rate for various applications. This may enhance behavior and performance for various hardware and/or software components of a mobile computing device, such as power conservation, responsiveness, connectivity, costs, and so forth. This may also enhance user convenience by automatically selecting and establishing data connections to one or more data service platforms based on a set of decision parameters, rules and/or preferences.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals.

FIG. 1 illustrates one embodiment of an apparatus that may communicate across different types of wireless links. In particular, FIG. 1 shows a communications system 100 comprising various representative elements, including a mobile computing device 110 capable of communicating via wireless links 120-*m* with one or more wireless resources 130-*n*.

It is worthy to note that "m" and "n" and "p" and similar designators as used herein are intended to be variables representing any positive integer. Thus, for example, if an implementation sets a value for m=5, then a complete set of wireless links 120-*m* may include wireless links 120-1, 120-2, 120-3, 120-4 and 120-5. The embodiments are not limited in this context.

In the illustrated embodiment shown in FIG. 1, the mobile computing device 110 may include by way of example and not limitation a processor 102, a memory 103, a data service manager 104, one or more application programs 105-$p$, a radio module 106, a power module 108, a data store 111, an antenna 112, and a user interface 114. The radio module 106 may further include a link classifier 107 and one or more radios 116-$q$. The power module 108 may further include a power manager 109. These elements or portions of these elements may be implemented in hardware, software, firmware, or in any combination thereof. The embodiments are not limited to these depicted elements.

In various embodiments, the mobile computing device 110 may be generally configured to support or provide cellular voice communication, wireless data communication and computing capabilities. The mobile computing device 110 may be implemented as a combination handheld computer and mobile telephone, sometimes referred to as a smart phone. Examples of smart phones include, for example, Palm® products such as the Palm Pre™, Palm Pixi™ and Palm Treo™ line of smart phones. Although some embodiments may be described with the mobile computing device 110 implemented as a smart phone by way of example, it may be appreciated that the embodiments are not limited in this context. For example, the mobile computing device 110 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 8.

The processor 102 may comprise a general purpose processor, a communications processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, email, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 103 may comprise computer-readable media such as volatile or non-volatile memory units arranged to store programs and data for execution by the processor 102. As depicted in FIG. 1, the memory 103 may store a data service manager 104 in the form of executable program instructions, code or data, and a data store 111 to store information used by the data service manager 104. Additionally or alternatively, the memory 103 may also store one or more application programs 105-$p$ and/or a user interface 114 in the form of executable program instructions, code or data. The processor 102 may retrieve and execute the program instructions, code or data from the memory 103 to adaptively control one or more operational parameters for the mobile computing device 110, such as operation and/or communication parameters of the radio module 106. Although the data service manager 104, the application programs 105-$p$ and/or the user interface 114 are described as part of the memory 103 for execution by the processor 102, it may be appreciated that the data service manager 104, the application programs 105-$p$ and/or the user interface 114 may be stored and executed by other memory and processing resources available to the mobile computing device 110, such as a radio or communications processor and accompanying memory implemented by the radio module 106. Further, although the data service manager 104, the application programs 105-$p$ and the user interface 114 are depicted as software executed by a processor, it may be appreciated that some or all of these elements may be implemented in hardware as well using one or more integrated circuits, for example. The embodiments are not limited in this context.

The application programs 105-$p$ are generally designed to allow a user to accomplish one or more specific tasks. Examples of application programs 105-$p$ may include, without limitation, one or more message applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 110 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication. The illustrated embodiment shown in FIG. 1 illustrates a phone application 105-1, a browser application 105-2, and a message application 105-3. It may be appreciated, however, that the mobile computing device 110 may have other application programs 105-$p$ as desired for a given implementation. The embodiments are not limited in this context.

The user interface 114 may comprise any user interface or graphic user interface (GUI) suitable for use with the mobile computing device 110. The user interface 114 may comprise a stand-alone application or part of another application, such as an operating system. The user interface 114 may be arranged to receive information from the data service manager 104 and/or the application program 105-$p$, and generate a user interface message for display on a digital display of the mobile computing device 110. The user interface message may also contain various user interface elements, such as radio buttons or menu choices, to receive user commands via a suitable input device (e.g., a touch screen, thumb board, keypad, trackball, scroll wheel, and so forth).

The radio module 106 may comprise one or more radios 116-$q$ (also referred to as wireless transceivers), each having various radio elements, including a radio processor, one or more transceivers, amplifiers, filters, switches, and so forth. The radio module 106 may communicate with remote devices across different types of wireless links utilizing various wireless wide area network (WWAN) communications techniques. For example, the radio module 106 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The radio module 106 (or additional radio modules) may also communicate across data networking links provided by one or more cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments, however, are not limited to these examples.

In some cases, the radio module 106 may additionally or alternatively communicate across various non-cellular communications links, such as a wireless local area network (WLAN). The radio module 106 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 110 may also utilize different types of shorter range wireless systems, or wireless personal area networks (WPAN) such as a Bluetooth system operating in accordance with the Bluetooth Special Interest Group (SIG) series of protocols, including Bluetooth Specification versions v1.0, v1.1, v1.2, v1.0, v2.0, v2.1, v3.0 with Enhanced Data Rate (EDR) (as well as one or more Bluetooth Profiles) and any revisions, progeny and variants, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

It may be appreciated that the radio module 106 may utilize different communications elements (e.g., radio processors, transceivers, etc.) to implement different communications techniques. Furthermore, the radio module 106 may support multiple communications techniques by implementing multiple sets of corresponding radio equipment. For example, the radio module 106 may support GSM communications using the radio 116-1, IEEE 802.xx (e.g., 802.11 or 802.16) communications using the radio 116-2, Bluetooth communications using the radio 116-3 (not shown), and so forth. The embodiments are not limited in this context.

The radio module 106 may have a link classifier 107 arranged to control some or all of the operations for the radio module 106. For instance, the link classifier 107 may cause one or more radios implemented by the radio module 106 to periodically or continuously scan wireless links 120-$m$ comprising one or more portions of the radio-frequency (RF) spectrum. The radio module 106 may implement a scanning algorithm to perform various scanning operations for radio energy. Radio energy may refer to RF energy used by a radio or wireless transceiver for communicating information, rather than spurious energy received from various electronic devices, such as a microwave, monitor, television, and so forth. For example, the radio module 106 and/or the link classifier 107 may measure a received radio signal strength, received signal strength (RSS) or received signal strength indication (RSSI) from nearby wireless resources 130-$n$ (collectively referred to herein as "RSSI"). An RSSI is typically a measurement of the power present in a received radio signal in arbitrary units. The RSSI may provide an indication of how much information may be communicated between devices. Typically a lower RSSI implies lower information rates or quality, while a higher RSSI implies higher information rates or quality.

The scanning operations may include scanning for radio energy of a given RSSI in the appropriate bands or sub-bands of the RF spectrum allocated to the one or more transceivers or radios implemented by the radio module 106. For example, the radio module 106 may scan for various wireless links 120-$m$ with various wireless resources 130-$n$. The wireless resources 130-$n$ may utilize a radio module implementing the same or similar communication techniques as implemented for the radio module 106. The radio module 106 may perform the scanning operations using a scan list to scan various sets of frequencies. The radio module 106 may perform scanning operations for any number of reasons, such as establishing, managing or terminating a voice communication session or a data communication session, performing hand-off operations when the mobile computing device 110 is moving between wireless resources (e.g., 130-1, 130-2), switching communication channels for the same wireless resource (e.g., 130-1) due to bandwidth or quality issues, and so forth.

The link classifier 107 may use the information collected during scanning operations to measure or estimate signal quality for a wireless link 120-$m$. Signal quality is determined by measuring, assessing and analyzing various communication parameters, such as RSS, RSSI, bit error rate (BER), signal-to-noise ratio (SNR), signal-to-interference ratio (SIR), signal-to-noise plus interference ratio (SNIR), signal-to-noise and distortion ratio (SINAD), carrier-to-noise ratio (CNR), pilot signal strength, ratio of received pilot energy to total received energy (EcIO), and other communication parameters. Additionally, the link classifier 107 may measure a transmission quality parameter, receive quality parameter, a communication protocol parameter, a modulation and coding scheme (MCS) parameter, a radio parameter, performance history parameter, and so forth. For instance, a performance history parameter may represent a number of failed calls at varying levels of signal quality for a wireless link 120-$m$. The embodiments are not limited in this context.

The link classifier 107 may use the information collected during scanning operations to measure or estimate signal quality for a wireless link 120-$m$. The link classifier 107 may then use the measured or estimated signal quality to classify the wireless link 120-$m$ into any number of defined categories. For instance, the categories may comprise low signal quality, medium signal quality and high signal quality, although any number of categories and labels may be used. The link classifier 107 may then use the measured signal quality to generate a class parameter representing a given classification or category of the measured signal quality. The link classifier 107 may then publish a class parameter or notification of a class parameter to the data service manager 104, an application 105-$p$, a system program such as an operating system, or some other hardware or software element of the mobile computing device 110. Additionally or alternatively, the link classifier 107 may automatically store the class parameter in the data store 111. Similarly, the data service manager 104, an application 105-$p$, a system program such as an operating system, or some other hardware or software element of the mobile computing device 110, may subscribe to the link classifier 107 to receive a class parameter or notification of a class parameter whenever created or modified by the link classifier 107.

The link classifier 107 may update a class parameter for a given wireless link 120-$m$ in a number of different ways. For instance, the link classifier 107 may update a class parameter for a wireless link 120-$m$ on a periodic, aperiodic or on-demand basis. Further, once the link classifier 107 assigns a class parameter to a wireless link 120-$m$, the link classifier 107 can promote or demote the class parameter for the wireless link 120-$m$ based on historical performance, current performance, or prospective performance. For instance, if the link classifier 107 assigns a class parameter of "1" for the wireless link 120-1, and determines that signal quality measurements for the wireless link 120-1 have been steadily improving, the link classifier 107 may promote the wireless link 120-1 to a class parameter of "2" based on the rate of improvement. Similarly, the link classifier may demote the wireless link 120-1 based on a rate of deterioration of the wireless link 120-1. Other factors may be used for class parameter promotion or demotion, and the embodiments are not limited in this context.

It is worthy to note that although the link classifier 107 is shown implemented as part of the radio module 106 in the depicted embodiment, it may be appreciated that the link classifier 107 may be implemented in other parts of the mobile computing device 110, such as the processor 102 and memory 103, for example. Further, the link classifier 107 may be implemented as part of a radio manager (not shown) for the radio module 106. The embodiments are not limited in this context.

The power module 108 may be arranged to provide power for the mobile computing device 110. In one embodiment, the power module 108 may comprise a power supply (or power supply unit) and the power manager 109. The power supply may be arranged to provide electrical power to the various elements of the mobile computing device 110, and include a power distribution system as well as primary and/or secondary sources of energy. The primary source may include AC line voltage converted to a well-regulated lower-voltage DC for electronic devices (e.g., using a transformer or power converter). The secondary source may include a portable power source, such as a battery, that provides lower-voltage DC as well. The battery may comprise rechargeable and/or non-rechargeable types of batteries.

The power manager 109 may manage various operations for the power supply and/or the mobile computing device 110, such as increasing or decreasing an amount of power provided to a given set of elements for the mobile computing device 110, or placing a given set of elements in various power consumption modes. The power manager 109 may also be arranged to measure an amount of remaining power capacity available from the power supply, and generate an available power parameter. The available power parameter may represent, for example, a discharge rate having a unit of amperes (A), milliampere (mA), ampere-hour (Ah), milliampere-hour (mAh), or milliampere second (mAs), or some other measurable power unit. In one embodiment, the available power parameter may vary as a function of radio signal conditions of a given RF operating environment. For example, better RF conditions typically consume less transmit power, and therefore a radio from the radio module 106 may transmit at a lower power level. As a result, x mA of a battery is able to last longer. By way of contrast, under worse RF conditions, the same x mA of battery may last for a shorter period of time since the radio has to transmit at higher power level. In one embodiment, for example, the power manager 109 may exchange information with the link classifier 107 to factor in radio signal conditions when determining an available power parameter for the power supply of the power module 108.

The wireless resources 130-$n$ may comprise any wireless device, fixed or mobile, utilizing a radio module implementing the same or similar communication techniques as implemented for the radio module 106. Examples of wireless resources 130-$n$ may include without limitation a wireless access point for a WLAN such as an 802.11 or 802.16 system, a base station or node B for a WWAN such as a cellular radiotelephone system, a wireless gateway for an enterprise network, a peer device such as another mobile computing device 110, a Bluetooth device for a WPAN, and so forth.

In general operation, the radio module 106 may monitor wireless links 120-$m$ with one or more wireless resources 130-$n$, such as a wireless access point or base station. In one embodiment, for example, the link classifier 107 may be operative to collect one or more samples for the one or more wireless links 120-$m$ based on the received radio signals. The sample may be some measurable characteristic of the one or more wireless links 120-$m$, such as a RSSI value and/or SNR value derived from the received radio signals from the one or more wireless resources 130-$n$, for example. Other measurable characteristics for the wireless links 120-$m$ may be collected as well. The embodiments are not limited in this context.

By virtue of the various radios 116-$q$ implemented by the radio module 106, some of which are capable of providing data services over data communications channels, the mobile computing device 110 may be arranged to support data communications with various data services offered by different data service platforms 132-$r$ and/or devices 138-$d$. The data service platforms 132-$r$ and/or devices 138-$d$ may comprise or be implemented as network devices (e.g., servers, server arrays, network appliances, computers, endpoint devices, user equipment, and so forth) implementing one or more VOP service features, gateway service features, website service features, voicemail service features, message service features, unified messaging service features, interactive voice response (IVR) service features, and other network data services. The various application programs 105-$p$ may be communicatively coupled to the data service manager 104, and may access the various data service features of the various data service platforms 132-$r$ through the data service manager 104, or vice-versa. The user interface 114 may be communicatively coupled to the application programs 105-$p$ and the data service manager 104 to provide custom GUI views to a user and receive user input for enhanced data service management.

In general operation, the radios 116-$q$ of the mobile computing device 110 may communicate information over one or more wireless links 120-$m$. The link classifier 107 may generate a class parameter for the wireless link 120-$m$ based on signal quality measurements of the wireless link 120-$m$. The link classifier may generate a class parameter on a periodic, aperiodic or on-demand basis. The data service manager 104 may receive a data service request from an application 105-$p$, and determine whether the application may communicate information over the wireless link 120-$m$ based on the class parameter for the wireless link 120-$m$. The data service manager 104 may generate a control directive for the requesting application granting or denying the data service request. These and other operations for the mobile computing device 110 may be described in more detail with reference to FIG. 2.

Figure 2:
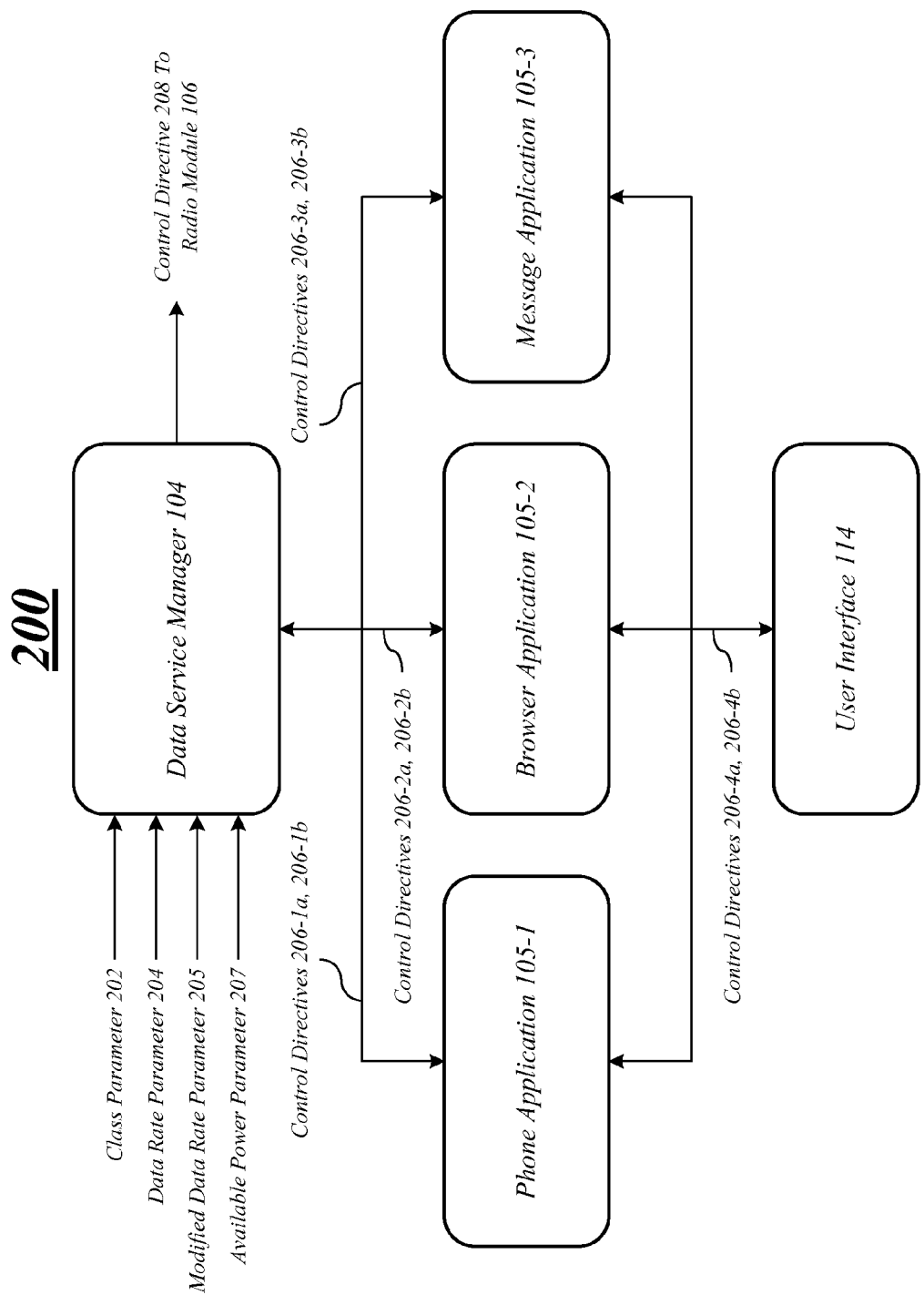
FIG. 2 illustrates one embodiment of a logic diagram.

FIG. 2 illustrates a logic diagram 200. The logic diagram 200 may illustrate one or more interfaces that may employ various techniques to exchange information between the elements of the mobile computing device 110, such as those shown and described with reference to the mobile computing device 110 of FIG. 1. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In particular, FIG. 2 illustrates an exemplary data service management architecture suitable for managing various data service features for the mobile computing device 110. As shown in FIG. 2, the data service manager 104 may be communicatively coupled to each of the application programs 105-$p$ and the user interface 114 to exchange information with each other over one or more communications buses and associated interfaces. In various embodiments, the data service manager 104 may be operative to communicate one or more control directives 206-$t$ with the various application programs 105-$p$, and manage access and use of the radios 116-$q$ of the radio module 106 based on the received control directives 206-$t$. For instance, the data service manager 104 may manage or control access to wireless links 120-$m$ for communicating information with different data service platforms 132-$r$ accessible via one or more radios 116-$q$ of the radio module 106 on behalf of the mobile computing device 110 in general, and the application programs 105-$p$, in particular.

In various embodiments, the data service manager 104 and the phone application 105-1 may interoperate to manage access and use of any of the data service platforms 132-$r$ and associated data services. The phone application 105-1 may interoperate with the user interface 114 to implement and manage telephony services for the mobile computing device 110, such as initiating outgoing telephone calls, receiving incoming telephone calls, establishing call conferences, call forwarding, call hold, audio levels, alerts, ringtones, speed-dialing, cellular telephone services, VOP telephony services, Push-to-Talk (PTT) services, and so forth. In one embodiment, the phone application 105-1 may send one or more control directives 206-1 to the data service manager 104 to initiate data services, such as initiating a VOP telephone call or accessing a VOP voicemail service, as provided by one of the multiple data service platforms 132-$r$. In one embodiment, the phone application 105-1 provides VOP telephony services utilizing data communications channels provided by a cellular radiotelephone network, a satellite network or a mobile data network. The embodiments are not limited in this context.

In various embodiments, the data service manager 104 and the browser application 105-2 may interoperate to manage access and use of any of the data service platforms 132-$r$ and associated data services. The browser application 105-2 may interoperate with the user interface 114 to implement and manage Internet and World Wide Web (WWW) information for the mobile computing device 110. In one embodiment, the browser application 105-2 may send one or more control directives 206-2 to the data service manager 104 to initiate data services, such as web browsing operations, as provided by one of the multiple data service platforms 132-$r$.

In various embodiments, the data service manager 104 and the message application 105-3 may interoperate to manage access and use of any of the data service platforms 132-$r$ and associated data services. In one embodiment, for example, the message application 105-3 may send one or more control directives 206-3 to the data service manager 104 to initiate various message services associated with one of the multiple data service platforms 132-$r$. The mobile computing device 110 may comprise or implement one or more message applications 105-3 arranged to communicate various types of messages in a variety of formats. Each of the message applications 105-3 may be representative of a particular kind of transport, enabling handling of messages of particular types and formats for the particular application. The message applications 105-3 may comprise without limitation a facsimile application, a video message application, an instant messaging (IM) application, a chat application, an email application, a short message service (SMS) application, a multimedia message service (MMS) application, a social network system (SNS) application, and so forth. It is to be understood that the embodiments are not limited in this regard and that the message applications 105-3 may include any other type of messaging or communications application which is consistent with the described embodiments. It also is to be appreciated that the mobile computing device 110 may implement other types of applications in addition to message applications 105-3 which are consistent with the described embodiments.

In various embodiments, the data service manager 104 may be operative to receive one or more parameters associated with the various elements of the mobile computing device 110. In one embodiment, for example, the data service manager 104 may receive a class parameter 202, a data rate parameter 204, a modified data rate parameter 205, and an available power parameter 207. Each of these parameters will be described in detail below. It may be appreciated that the data service manager 104 may also have access to other parameters and information as well, such as those stored in the data store 111 of the memory 103, for example. The embodiments are not limited in this context.

In various embodiments, the data service manager 104 may be operative to receive one or more control directives 206-$t$ from the various application programs 105-$p$, and manage access to the radios 116-$q$ of the radio module 106 based on the received control directives 206-$t$. For instance, the data service manager 104 may receive a control directive 206-$t$ to initiate a data service request for access to a wireless link 120-$m$ to connect to a wireless resource 130-$n$ for data services provided by one of the multiple data service platforms 132-$r$. Further, the control directive 206-$t$ may also include additional information with a data service request, such as a data rate parameter 204 requested by an application 105-$p$.

In one embodiment, for example, the radio 116-1 of the mobile computing device 110 may communicate information over a wireless link 120-1. The link classifier 107 may generate a class parameter 202 for the wireless link 120-1 based on signal quality measurements of the wireless link 120-1, and forward the class parameter 202 to the data service manager 104. The data service manager 104 may receive a data service request from the phone application 105-1 as a control directive 206-1$a$. The data service manager 104 may determine whether the phone application 105-1 may communicate information over the wireless link 120-1 based on the class parameter 202 for the wireless link 120-1. The data service manager 104 may then generate a control directive 206-1$b$ for the application 105-1 granting or denying the data service request sent as the control directive 206-1$a$.

The data service manager 104 may generate a control directive 208 for delivery to the radio module 106. For instance, the control directive 208 may indicate whether the phone application 105-1 may or may not access the radio 116-1. The radio module 106 may use information provided by the control directive 208 to control access to the radio 116-1 by the phone application 105-1.

In addition to the class parameter 202, the data service manager 104 may further receive or retrieve a data rate parameter 204 associated with the application. For instance, the data service manager 104 may receive the data rate parameter 204 from the phone application 105-1. In another example, the data service manager 104 may retrieve the data rate parameter 204 from the data store 111, such as from a look-up table (LUT), for example.

A data rate parameter 204 may refer to an amount of bandwidth for communicating information over a wireless link 120-*m*, such as between an application 105-*p* and a data service platform 132-*r*, for example. In general, data rate, digital data rate, digital bandwidth, network bandwidth or just bandwidth is a measure of available or consumed data communication resources expressed in bits per second (bit/s) or multiples of it (e.g., kbit/s, Mbit/s etc). Bandwidth may refer to bandwidth capacity or available bandwidth in bit/s, which typically means the net bit rate, channel capacity or the maximum throughput of a logical or physical communication path in a digital communication system. Bandwidth corresponding to an average data rate of successful data transfer through a communication path may sometimes be referred to as "throughput" or "goodput."

The data service manager 104 may determine whether the application 105-1 may communicate information over the wireless link 120-1 at the data rate parameter 204 based on the class parameter 202 for the wireless link 120-1. The data service manager 104 may then generate the control directive 206-1*b* for the application 105-1 granting or denying the data service request indicated by the control directive 206-1*a* at the data rate parameter 204.

The data service manager 104 may generate a control directive 208 for delivery to the radio module 106. For instance, the control directive 208 may indicate whether the phone application 105-1 may or may not access the radio 116-1 at the data rate parameter 204. The radio module 106 may use information provided by the control directive 208 to control access to the radio 116-1 by the phone application 105-1, and a data rate allocated to the phone application 105-1.

As previously described, the user interface 114 may comprise any user interface or GUI suitable for use with the mobile computing device 110. The user interface 114 may be arranged to receive information from the data service manager 104 and/or an application program 105-*p*, and generate a user interface message for display on a digital display of the mobile computing device 110. The user interface message may also contain various user interface elements, such as radio buttons or menu choices, to receive user commands via a suitable input device (e.g., a touch screen, thumb board, keypad, trackball, scroll wheel, and so forth). The user interface 114 may be used to communicate information for display to a user, such as whether an application 105-*p* has been granted or denied access to a radio 116-*q*, data rates allocated to an application 105-*p*, which radios 116-*q* and associated wireless links 120-*m* are available for an application 105-*p*, override options for any automatic decisions made by the data service manager 104, and other user information and commands. A user may use an input device to input user commands to control communication aspects associated with the applications 105-*p*.

Operations for the above embodiments may be further described with reference to the following figures and accompanying examples. Some of the figures may include a logic flow and/or a logic diagram. Although such figures presented herein may include a particular logic flow and/or logic diagram, it can be appreciated that the logic flow and/or logic diagram merely provides an example of how the general functionality as described herein can be implemented. Further, the given logic flow and/or logic diagram does not necessarily have to be executed in the order presented, unless otherwise indicated. In addition, the given logic flow and/or logic diagram may be implemented by a hardware element (e.g., a logic device), a software element executed by a processor, or any combination thereof. The embodiments are not limited in this context.

Figure 3:
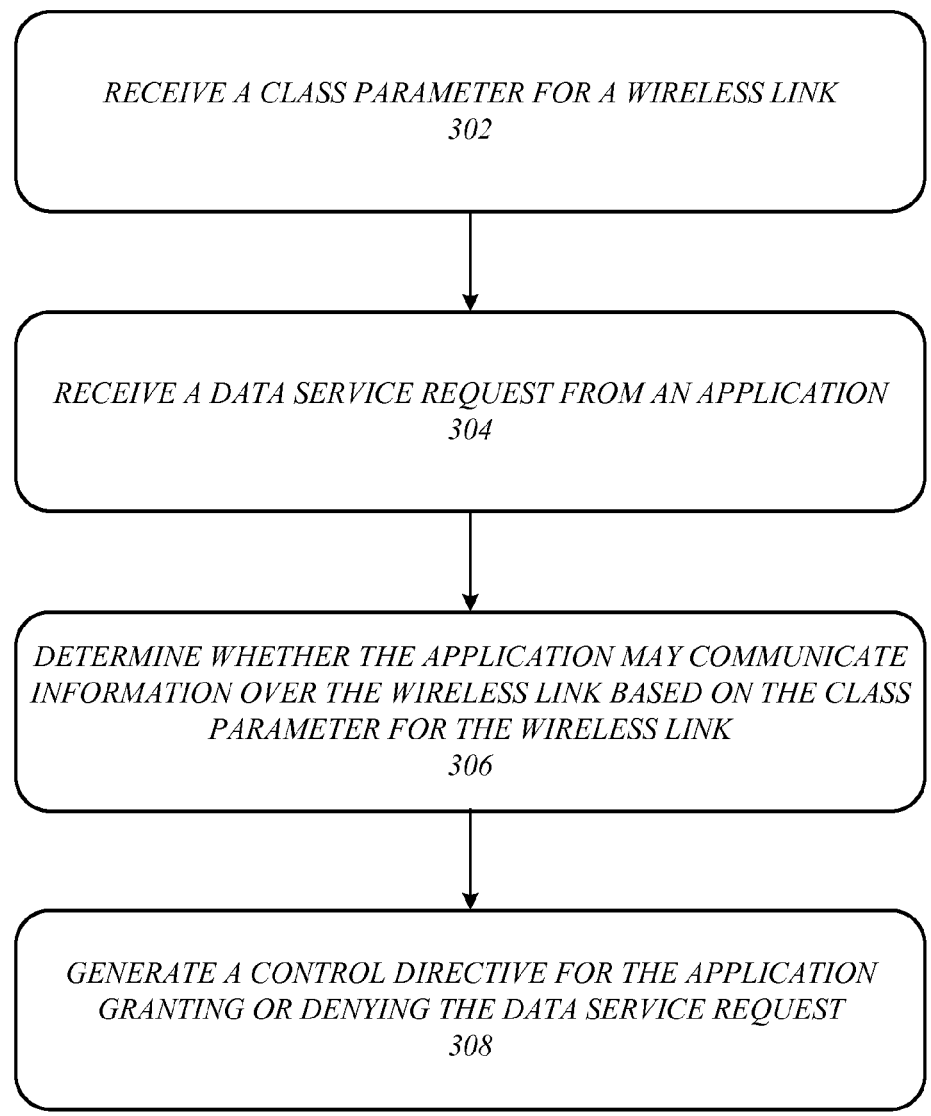
FIG. 3 illustrates one embodiment of a first logic flow.

FIG. 3 illustrates a logic flow. In particular, FIG. 3 illustrates a logic flow 300, which may be representative of the operations executed by one or more embodiments described herein, such as by the data service manager 104, for example.

As shown in the FIG. 3, the logic flow 300 may receive a class parameter for a wireless link at block 302. For example, the data service manager 104 may receive a class parameter 202 for a wireless link 120-2 from the link classifier 107 of the radio module 106. The data service manager 104 may receive the class parameter 202 on a periodic, aperiodic or on-demand basis. The embodiments are not limited in this context.

The logic flow 300 may receive a data service request from an application. For example, the data service manager 104 may receive a data service request as a control directive 206-2*a* from the browser application 105-2. Optionally, the control directive 206-2*a* may include the data rate parameter 204. The receipt of the data service request is an initiation event that causes the data service manager 104 to initiate access and allocation operations of a wireless link 120-*m* to an application 105-*p*. Additionally or alternatively, other initiation events may include those based on time schedules, system events independent of the applications 105-*p*, events generated by a remote device, user-initiated events, and other types of events. The embodiments are not limited in this context.

The logic flow 300 may determine whether the application may communicate information over the wireless link based on the class parameter for the wireless link. For example, the data service manager 104 may determine whether the browser application 105-2 may communicate information over the wireless link 120-2 based on the class parameter 202 for the wireless link 120-2. For example, the browser application 105-2 may send a Hypertext Transfer Protocol (HTTP) request as the data service request of control directive 206-2*a* to the data service manager 104. The embodiments are not limited in this context.

The logic flow 300 may generate a control directive for the application granting or denying the data service request. For example, the data service manager 104 may generate a control directive 206-2*b* for the browser application 105-2 granting or denying the data service request sent as the control directive 206-2*a*. The embodiments are not limited in this context.

Figure 4:
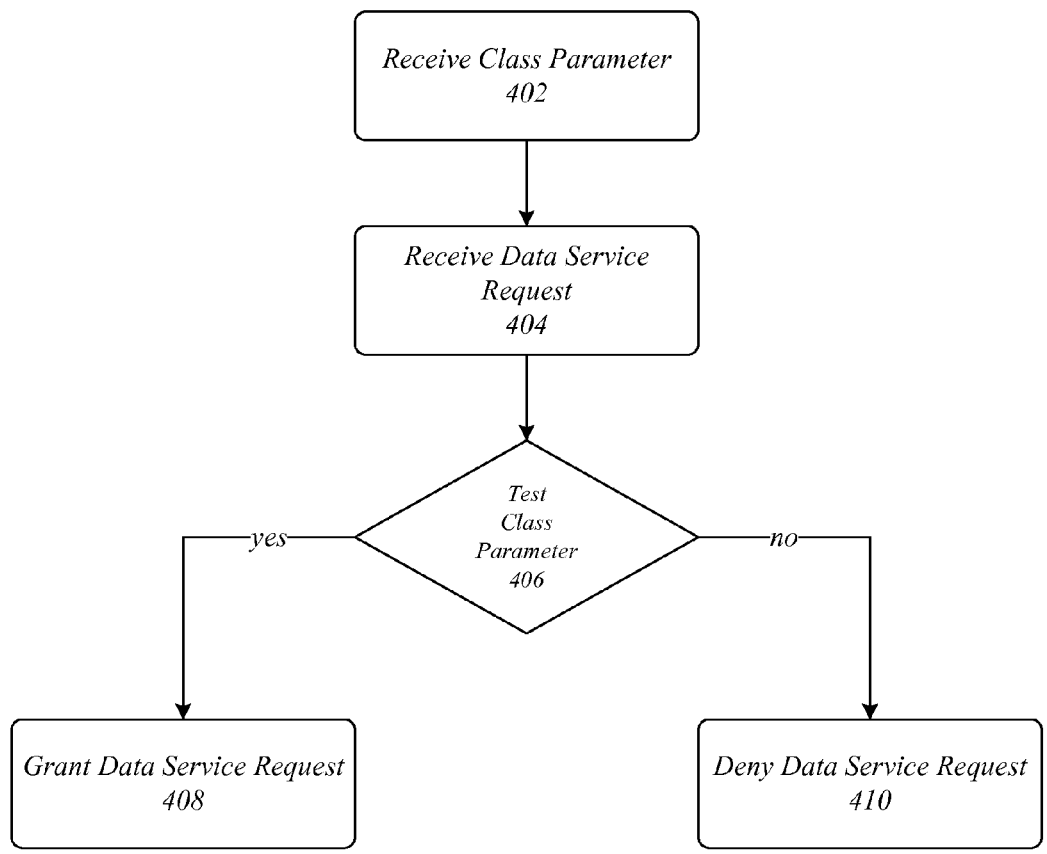
FIG. 4 illustrates one embodiment of a second logic flow.

FIG. 4 illustrates a logic flow. In particular, FIG. 4 illustrates a logic flow 400, which may be representative of a more particular set of operations executed by one or more embodiments described herein, such as by the data service manager 104, for example.

As illustrated in FIG. 4, the logic flow 400 begins by receiving a class parameter 202 at block 402 and a data service request at block 404 as previously described with reference to respective blocks 302 and 304 of FIG. 3. The logic flow 400 implements a test at diamond 406 to determine whether the browser application 105-2 may communicate information over the wireless link 120-2 based on the class parameter 202 for the wireless link 120-2. For instance, the data service manager 104 may use a value for the class parameter 202 as an index for a LUT. Assume that the link classifier 107 measures RSSI for the wireless link 120-2 and determines whether the signal quality for the wireless link 120-2 falls into one of three classes, as shown in Table 1 as follows:

TABLE 1

| Class Parameter | Class | Application |
|---|---|---|
| 1 | Low Signal Quality | Message Application |
| 2 | Medium Signal Quality | Browser Application |
|   |   | Message Application |
| 3 | High Signal Quality | Phone Application |
|   |   | Browser Application |
|   |   | Message Application |

The data service manager 104 may test the class parameter 202 at diamond 406 utilizing a LUT similar to Table 1 in the data store 111. Table 1 illustrates three values for a class parameter 202 of "1" and "2" and "3" each corresponding to classes of low signal quality, medium signal quality and high signal quality. Table 1 further illustrates applications 105-$p$ suitable for utilizing data services of a given class. For instance, when the class parameter 202 is set to a value of 1 representing a low signal quality for the wireless link 120-2, the only application 105-$p$ suitable for utilizing a wireless link 120-$m$ is the messaging application 105-3 since it communicates information requiring lower Quality of Service (QoS) and can tolerate latency. When the class parameter 202 is set to a value of 2 representing a medium signal quality for a wireless link 120-$m$, the browser application 105-2 may also be suitable for using the wireless link 120-$m$ since it communicates information in bursts and can tolerate some latency, although not as much as the messaging application 105-3, for example. When the class parameter 202 is set to a value of 3 representing a high signal quality for a wireless link 120-$m$, any application 105-$p$ may use the wireless link 120-$m$, including the phone application 105-1 since it communicates information sensitive to latency and typically requiring a higher QoS. It may be appreciated that Table 1 is provided merely by example and not limitation, and any number of class parameters, classes and applications 105-$p$ may be included in a given implementation.

Additionally or alternatively, the data service manager 104 may test the class parameter 202 by comparing the class parameter 202 with defined values representing each of the applications 105-$p$. For instance, assume the phone application 105-1 is assigned a defined value of "3," the browser application 105-2 is assigned a defined value of "2," and the message application 105-3 is assigned a defined value of "1." The defined values may be stored in memory 103, a register, a LUT, and so forth. The data service manager 104 may then compare a value for a class parameter 202 with the defined values for applications 105-$p$ to determine whether to grant or deny a data service request from a given application 105-$p$. For instance, assume a comparison rule was defined where a value for a class parameter 202 must be equal to or higher than a defined value for an application 105-$p$ in order for the data service manager 104 to grant a data service request from the application 105-$p$ as shown in block 408, otherwise the data service manager 104 must deny the data service request from the application 105-$p$ as shown in block 410. If a class parameter 202 for a wireless link 120-1 is assigned a value of "1," and the data service request was received by the data service manager 104 from the phone application 105-1 having a defined value of "3," then the data service manager 104 may compare the class parameter 202 of "1" with the defined value of "3" and determine that the class parameter 202 is lower than the defined value for the phone application 105-1 at diamond 406, and therefore the data service manager 104 must deny the data service request from the phone application 105-1 at block 410.

Figure 5:
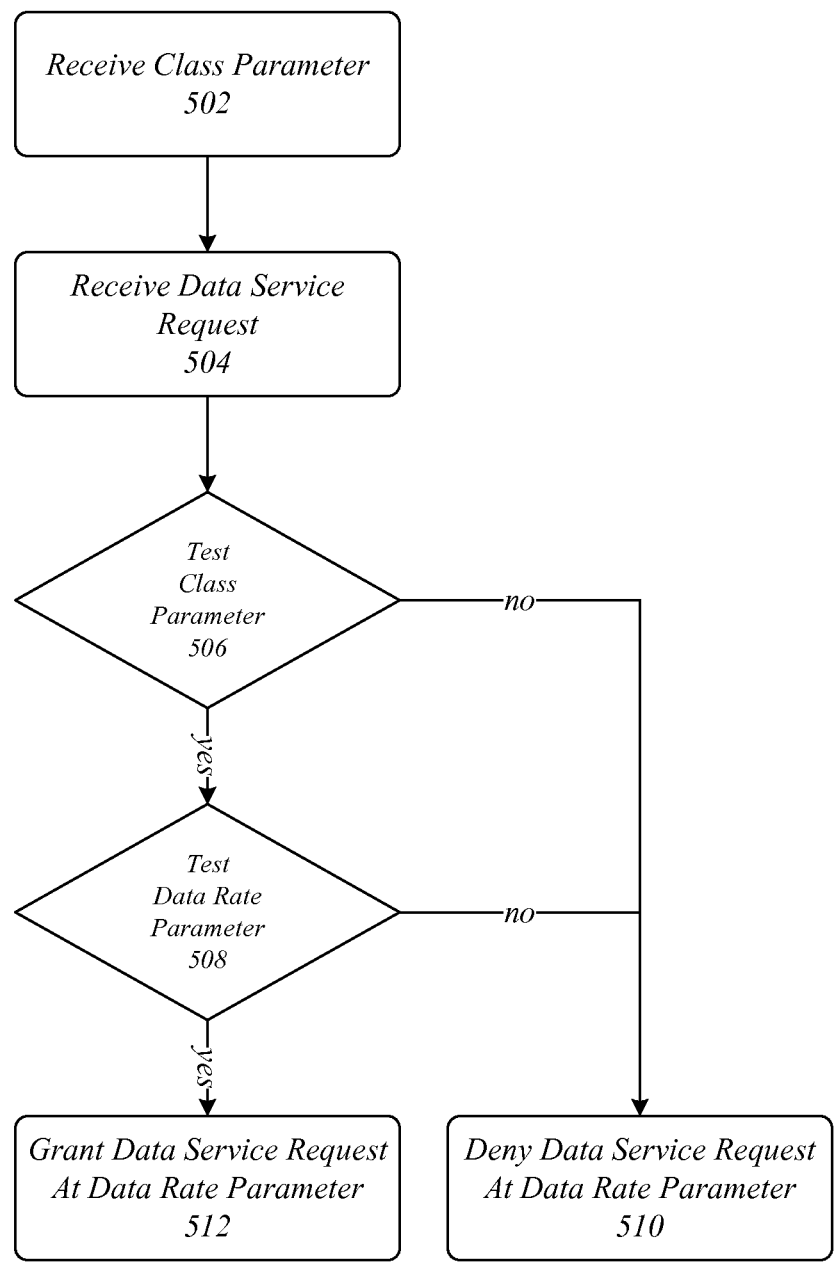
FIG. 5 illustrates one embodiment of a third logic flow.

FIG. 5 illustrates a logic flow. In particular, FIG. 5 illustrates a logic flow 500, which may be representative of a more particular set of operations executed by one or more embodiments described herein, such as by the data service manager 104, for example.

As illustrated in FIG. 5, the logic flow 500 begins by receiving a class parameter 202 at block 502 and a data service request at block 504 as previously described with reference to respective blocks 302 and 304 of FIG. 3. Further, the logic flow 500 performs a test for the class parameter 202 at diamond 506 using operations similar to those of diamond 406 as described with reference to FIG. 4. However, rather than simply granting or denying a data service request from an application 105-$p$, the logic flow 500 provides an extra test related to the data rate parameter 204.

If the decision at diamond 506 is to grant a data service request based on the class parameter 202, the data service manager 104 retrieve a data rate parameter 204 associated with an application 105-$p$. The data service manager 104 may then determine whether an application 105-$p$ may communicate information over a wireless link 120-$m$ at the data rate parameter 204 based on the class parameter 202 for the wireless link 120-$m$. By way of example, assume the data service manager 104 utilizes a LUT as shown in Table 2 as follows:

TABLE 2

| Class Parameter | Class | Application | Available Bandwidth |
|---|---|---|---|
| 1 | Low Signal Quality | Message Application | 100 Kbit/s |
| 2 | Medium Signal Quality | Browser Application Message Application | 500 Kbit/s |
| 3 | High Signal Quality | Phone Application Browser Application Message Application | 2 Mbit/s |

Table 2 is similar to Table 1, and stores additional information regarding available bandwidth for a wireless link 120-$m$. The link classifier 107 may use the information collected during scanning operations to measure or estimate available bandwidth for a wireless link 120-$m$. The link classifier 107 may collect or measure various characteristics of an RF channel to estimate an available bandwidth for the RF channel. The radio manager 107 may use prospective or historical information about the RF channel to generate an available bandwidth parameter for one or more radios of the radio module 106. The link classifier 107 may generate an available bandwidth parameter on a periodic, aperiodic or on-demand basis, and store it in a LUT used by the data service manager 104.

By way of example, assume the browser application 105-2 sends a data service request with a data rate parameter 204 of 1 Mbit/s to communicate real-time streaming multimedia information. At diamond 506, the data service manager 104 may determine whether the browser application 105-2 may access the wireless link 120-1 based on the class parameter 202. Assume the class parameter 202 is set to a value of "3" indicating a high signal quality for the wireless link 120-1. Since the defined value for the browser application 105-2 is "2" which is lower than the class parameter 202, then the browser application 105-2 passes the first test at diamond

506. At diamond 508, the data service manager 104 may determine whether the browser application 105-2 may access the wireless link 120-1 at the data rate parameter 204 of 1 Mbit/s based on the class parameter 202. For instance, the data service manager 104 may check an available bandwidth parameter associated with the class parameter 202 as calculated by the link classifier 107. In this case, Table 2 indicates that a class parameter 202 set to a value of "3" for the wireless link 120-1 has an available bandwidth parameter of 2 Mbit/s. Since the data rate parameter 204 is set to 1 Mbit/s and the available bandwidth parameter is set to 2 Mbit/s, the test at diamond 508 is successful, and the data service manager 104 grants the data service request from the browser application 105-2 at the data rate parameter 204 of 1 Mbit/s. If either test at diamonds 506, 508 results in a failure then the data service manager 104 denies the data service request at the data rate parameter 204 of 1 Mbit/s. The data service manager 104 may then generate a control directive 206-t for the browser application 105-2 granting or denying the data service request at the data rate parameter 204.

Figure 6:
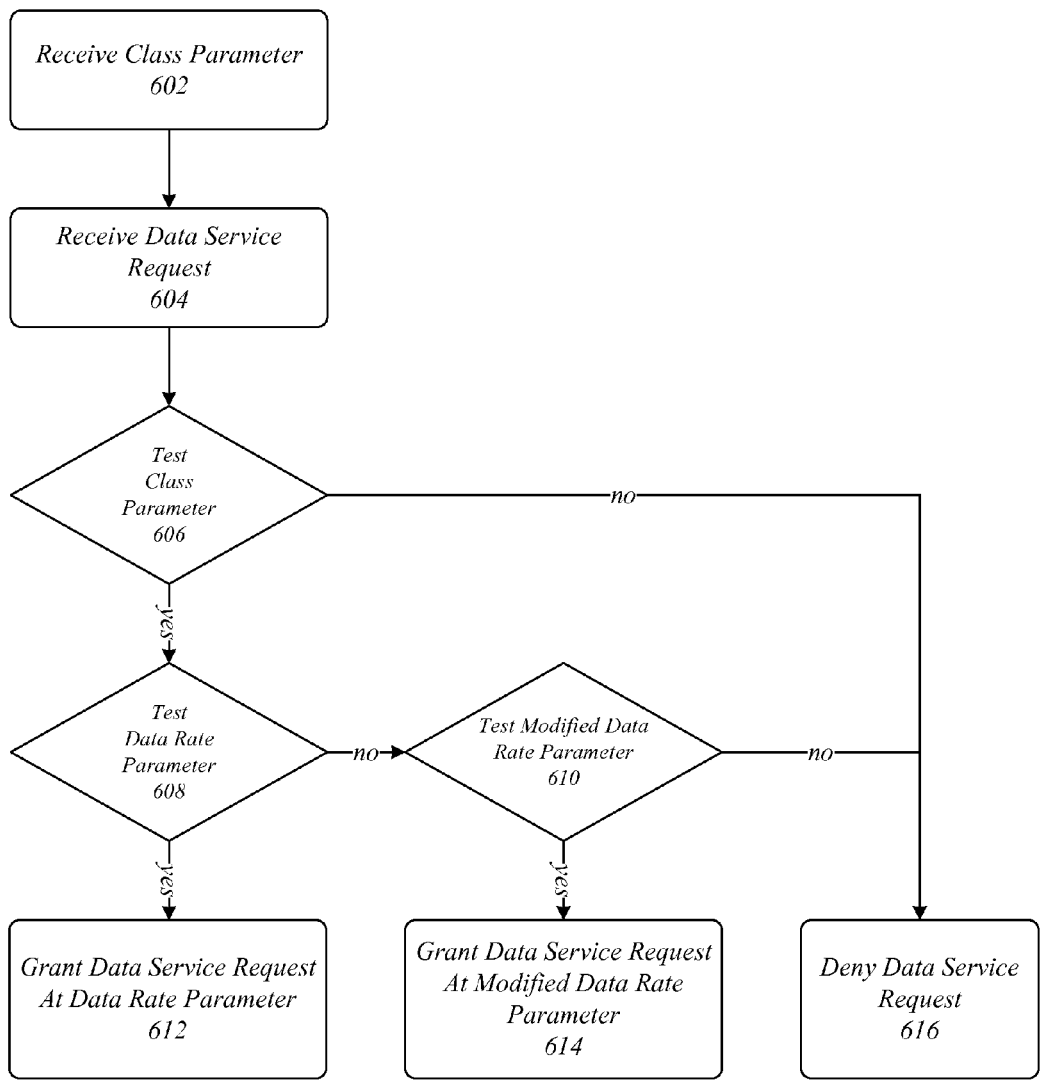
FIG. 6 illustrates one embodiment of a fourth logic flow.

FIG. 6 illustrates a logic flow. In particular, FIG. 6 illustrates a logic flow 600, which may be representative of a more particular set of operations executed by one or more embodiments described herein, such as by the data service manager 104, for example.

As illustrated in FIG. 6, the logic flow 600 begins by receiving a class parameter 202 at block 602 and a data service request at block 604 as previously described with reference to respective blocks 302 and 304 of FIG. 3. Further, the logic flow 600 performs a test for the class parameter 202 at diamond 606 and a test for the data rate parameter 204 at diamond 608 using operations similar to those of corresponding diamonds 506, 508 as described with reference to FIG. 5. However, rather than granting or denying a data service request from an application 105-p at the data rate parameter 204, the logic flow 600 provides an additional test related to a modified data rate parameter 205.

If the decision at diamond 608 is to deny a data service request at a given data rate parameter 204, the data service manager 104 may determine whether an application 105-p may communicate information over a wireless link 120-m at a modified data rate parameter 205 when the application 105-p may not communicate information over the wireless link 120-m at the data rate parameter 204 at diamond 610. In some cases, the data service manager 104 may suggest or select alternative data rates to the data rate parameter 204 as represented by the modified data rate parameter 205, rather than simply denying access to an application 105-p at a requested or associated data rate parameter 204.

Modifying our previous example, assume the browser application 105-2 sends a data service request with a data rate parameter 204 of 1 Mbit/s to communicate real-time streaming multimedia information. At diamond 606, the data service manager 104 may determine whether the browser application 105-2 may access the wireless link 120-1 based on the class parameter 202. Assume the class parameter 202 is set to a value of "2" indicating a medium signal quality. Since the defined value for the browser application 105-2 is "2" which is equal to the class parameter 202, the browser application 105-2 passes the first test at diamond 606. At diamond 608, the data service manager 104 may determine whether the browser application 105-2 may access the wireless link 120-1 at the data rate parameter 204 of 1 Mbit/s based on the class parameter 202. For instance, the data service manager 104 may check an available bandwidth parameter associated with the class parameter 202 as calculated by the link classifier 107. In this case, Table 2 indicates that a class parameter 202 for the wireless link 120-1 is set to a value of "2" and has an available bandwidth parameter of 500 Kbit/s. Since the data rate parameter 204 is set to 1 Mbit/s and the available bandwidth parameter is set to 500 Kbit/s, the test at diamond 608 fails. Rather than denying the data service request at a data rate parameter 204 of 1 Mbit/s, however, the data service manager 104 may determine whether the browser application 105-2 may utilize a lower data rate than 1 Mbit/s. A modified data rate parameter 205 may be negotiated with the browser application 105-2, selected by the data service manager 104 without any interaction with the browser application 105-2, or selected via a user command received via the user interface 114.

Assume the data service manager 104 and the browser application 105-2 exchange messages to negotiate a modified data rate parameter 205 of 500 Kbit/s. Since the modified data rate parameter 205 is set to 500 Kbit/s and the available bandwidth parameter is set to 500 Kbit/s, the test at diamond 610 is successful, and the data service manager 104 grants the data service request from the browser application 105-2 at the modified data rate parameter 205 of 500 Kbit/s. If either test at diamonds 606, 610 results in a failure then the data service manager 104 denies the data service request. The data service manager 104 may then generate a control directive 206-t for the browser application 105-2 granting or denying the data service request at the data rate parameter 204 and/or the modified data rate parameter 205.

As previously described, the data service manager 104 may determine whether an application 105-p may communicate information over a wireless link 120-m at a modified data rate parameter 205 when the application 105-p may not communicate information over the wireless link at a data rate parameter 204. In cases where the modified data rate parameter 205 is lower than the data rate parameter 204, and the test at diamond 610 is successful, the data service manager 104 generates a control directive 206-t for the application 105-p granting the data service request at the lower modified data rate parameter 205. This may be accomplished without the power module 108 of the mobile computing device 110 entering a power save mode. As previously described, the power manager 109 of the power module 108 may manage various operations for a power supply and/or the mobile computing device 110, such as increasing or decreasing an amount of power provided to a given set of elements for the mobile computing device 110, or placing a given set of elements in various power consumption modes. The data service manager 104 may reduce data rates allocated or assigned to specific applications 105-p without the power module 108 of the mobile computing device 110 entering a given power save mode.

Figure 7:
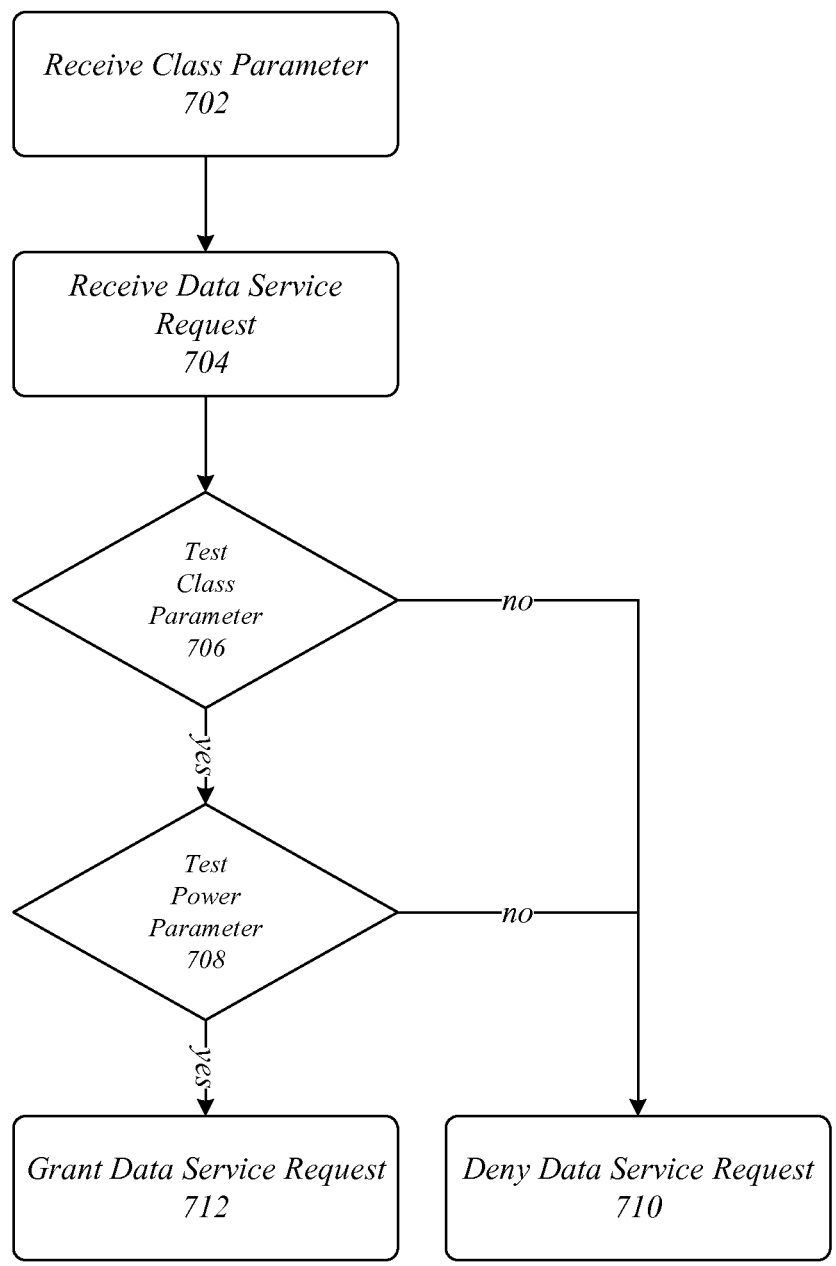
FIG. 7 illustrates one embodiment of a fifth logic flow.

FIG. 7 illustrates a logic flow. In particular, FIG. 7 illustrates a logic flow 700, which may be representative of a more particular set of operations executed by one or more embodiments described herein, such as by the data service manager 104, for example.

As illustrated in FIG. 7, the logic flow 700 begins by receiving a class parameter 202 at block 702 and a data service request at block 704 as previously described with reference to respective blocks 302 and 304 of FIG. 3. Further, the logic flow 700 performs a test for the class parameter 202 at diamond 706 using operations similar to those of diamond 406 as described with reference to FIG. 4. However, rather than simply granting or denying a data service request from an application 105-p, the logic flow 700 provides an extra test related to the available power parameter 207. The power manager 109 may be arranged to measure an amount of remaining power capacity available from the power supply, and generate an available power parameter 207 which may be stored in the data store 111, for example.

If the decision at diamond 706 is to grant a data service request based on the class parameter 202, the data service manager 104 retrieves an available power parameter 207 for the mobile computing device 110. The data service manager 104 may then determine whether an application 105-$p$ may communicate information over a wireless link 120-$m$ based on the class parameter 202 for the wireless link 120-$m$ and the available power parameter 207 for a battery of the mobile computing device 110 at block 709. For instance, the data service manager 104 may access defined values associated with each application 105-$p$ representing power cut-offs. If an available power parameter 207 for a battery is equal to or above a defined value for a given application 105-$p$, then the test at diamond 708 succeeds, and the data service manager 104 grants the data service request at block 712. If the available power parameter 207 for a battery is below a defined value for a given application 105-$p$, then the test at diamond 708 fails, and the data service manager 104 denies the data service request at block 710. The data service manager 104 generates a control directive 206-$t$ for the application 105-$p$ granting or denying the data service request.

Additionally or alternatively, the logic flow 700 may be modified to test for other parameters in addition to the class parameter 202 and the available power parameter 207, such as the data rate parameter 204 and the modified data rate parameter 205 as described with reference to FIGS. 5, 6. For instance, a comparison may be made between an amount of remaining power as indicated by the available power parameter 207 and a data rate requested by an application 105-$p$ as indicated by the data rate parameter 205. This comparison may factor in any increase or decrease in a rate of consumption of the remaining power as a function of the data rate parameter 205 used by an application 105-$p$ via a radio 116-$q$, and in some cases, suggest alternative data rates via the modified data rate parameter 205 accordingly.

In various embodiments, the data service manager 104 may be arranged to determine an override condition associated with a data service request, and if present, generate a control directive 206-$t$ for an application 105-$p$ granting or denying a data service request. In order to limit programmatic operations of the data service manager 104 in granting or denying access to communications resources of the mobile computing device 110, a certain number of override conditions or rules may be implemented to override any decisions reached by the data service manager 104. Examples of override conditions may include without limitation determining a priority level for an application 105-$p$, determining an application 105-$p$ was initiated by a user control directive received via the user interface 114, determining an application 105-$p$ is a VOP application, and so forth. For instance, override rules may reflect policy decisions, such as prioritizing user selections over automatic selections, prioritizing phone calls over browser sessions, and so forth. The override conditions may vary according to a particular implementation, and the embodiments are not limited in this context.

In various embodiments, the data service manager 104 may switch wireless links 120-$m$ rather than grant or deny access to a single wireless link 120-$m$. The radio module 106 includes multiple radios 116-$q$ capable of establishing multiple wireless links 120-$m$. Rather than limiting examination to only a single wireless link 120-$m$ when determining whether to grant or deny access to an application 105-$p$, the data service manager 104 may scan and evaluate all available wireless links 120-$m$ to determine whether one of the wireless links 120-$m$ provide a signal quality, data rate and/or power consumption suitable for a requesting application 105-$p$. For instance, the wireless link 120-1 may provide a higher signal quality or consume power at a lower rate than the wireless link 120-2. The data service manager 104 may analyze all communication resources available to the mobile computing device 110 when managing access and use of the communications resources by the applications 105-$p$.

In various embodiments, the data service manager 104 may determine whether to grant or deny access to a wireless link 120-$m$ based on a number of applications 105-$p$ that are currently executing in parallel. In some cases, multiple applications 105-$p$ may be sending corresponding data service requests at the same time to use a wireless link 120-$m$, utilizing data services for a wireless link 120-$m$ at the same time, or some combination of both. In such cases, the data service manager 104 may determine whether to grant or deny access to a given application 105-$p$, and potentially at a given data rate parameter 204 for the given application 105-$p$, based on some or all of the applications 105-$p$ requesting access or currently utilizing a wireless link 120-$m$. For instance, a priority level may be assigned to each application 105-$p$, and the data service manager 104 may control access and data rates for each application 105-$p$ based on its assigned priority level, in addition to the other parameters utilized by the data service manager 104. Other factors may be used for allocating access and data rates among multiple applications 105-$p$ for a wireless link 120-$m$, and the embodiments are not limited in this context.

Figure 8:
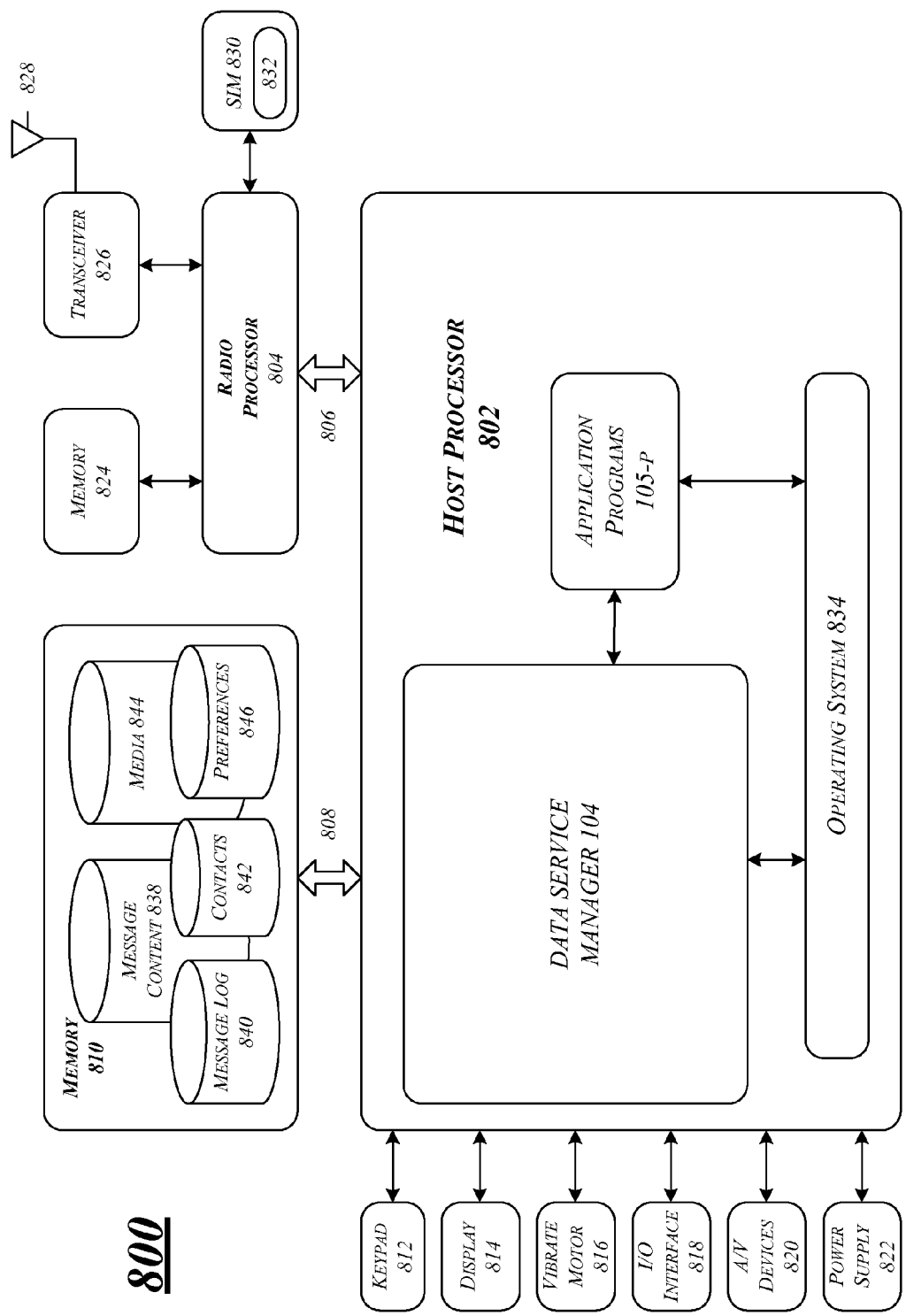
FIG. 8 illustrates one embodiment of a second mobile computing device.

FIG. 8 illustrates a block diagram of a second mobile computing device 800 suitable for implementing various embodiments, including the mobile computing device 110. It may be appreciated that the mobile computing device 800 is only one example of a suitable mobile computing environment and is not intended to suggest any limitation as to the scope of use or functionality of the embodiments. Neither should the mobile computing device 800 be interpreted as having any dependency or requirement relating to any one or combination of components illustrated in the exemplary mobile computing device 800.

The host processor 802 (e.g., similar to the processor 102) may be responsible for executing various software programs such as system programs and applications programs to provide computing and processing operations for the mobile computing device 800. The radio processor 804 may be responsible for performing various voice and data communications operations for the mobile computing device 800 such as transmitting and receiving voice and data information over one or more wireless communications channels. Although the mobile computing device 800 is shown with a dual-processor architecture, it may be appreciated that the mobile computing device 800 may use any suitable processor architecture and/or any suitable number of processors or number of processor cores in accordance with the described embodiments. In one embodiment, for example, the processors 802, 804 may be implemented using a single integrated processor.

The host processor 802 may be implemented as a host central processing unit (CPU) using any suitable processor or logic device, such as a as a general purpose processor. The host processor 802 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 802 may be coupled through a memory bus 808 to a memory 810. The memory bus 808 may comprise any suitable interface and/or bus architecture for allowing the host processor 802 to access the memory 810. Although the memory 810 may be shown as being separate from the host processor 802 for purposes of illustration, it is worthy to note that in various embodiments some portion or the entire memory 810 may be included on the same integrated circuit as the host processor 802. Alternatively, some portion or the entire memory 810 may be disposed on an integrated circuit or other medium (e.g., hard disk drive) external to the integrated circuit of the host processor 802. In various embodiments, the mobile computing device 800 may comprise an expansion slot to support a multimedia and/or memory card, for example.

The memory 810 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 800 may comprise an alphanumeric keypad 812 coupled to the host processor 802. The keypad 812 may comprise, for example, a QWERTY key layout and an integrated number dial pad. The mobile computing device 800 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 812 may comprise a physical keypad using hard buttons, or a virtual keypad using soft buttons displayed on a display 814. The keypad may also comprise a thumbboard.

The mobile computing device 800 may comprise a display 814 coupled to the host processor 802. The display 814 may comprise any suitable visual interface for displaying content to a user of the mobile computing device 800. In one embodiment, for example, the display 814 may be implemented by a liquid crystal display (LCD) such as a touch-sensitive or touch screen color (e.g., 216-bit color) thin-film transistor (TFT) LCD screen. The touch-sensitive or touch screen LCD may be used with a stylus and/or a handwriting recognizer program.

The mobile computing device 800 may comprise a vibrating motor 816 coupled to the host processor 802. The vibrating motor 816 may be enable or disabled according to the preferences of the user of the mobile computing device 800. When enabled, the vibrating motor 816 may cause the mobile computing device 800 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 800 may comprise an input/output (I/O) interface 818 coupled to the host processor 802. The I/O interface 818 may comprise one or more I/O devices such as a serial connection port, SDIO bus, PCI, USB, an infrared port, integrated Bluetooth wireless capability, global position system (GPS) capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 800 may be arranged to synchronize information with a local computer system.

The host processor 802 may be coupled to various audio/video (A/V) devices 820 that support A/V capability of the mobile computing device 800. Examples of A/V devices 820 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 802 may be coupled to a power supply 822 arranged to supply and manage power to the elements of the mobile computing device 800. In various embodiments, the power supply 822 may be implemented by a rechargeable battery, such as a removable and rechargeable lithium ion battery to provide direct current (DC) power, and/or an alternating current (AC) adapter to draw power from a standard AC main power supply. The power supply 822 may be representative of a power supply for the power module 108 described with reference to FIG. 1, for example.

The radio processor 804 may be arranged to communicate voice information and/or data information over one or more assigned frequency bands of a wireless communication channel. The radio processor 804 may be implemented as a communications processor using any suitable processor or logic device, such as a modem processor or baseband processor. The radio processor 804 may also be implemented as a digital signal processor (DSP), media access control (MAC) processor, or any other type of communications processor in accordance with the described embodiments. The radio processor 804 may perform analog and/or digital baseband operations for the mobile computing device 800. For example, the radio processor 804 may perform digital-to-analog conversion (DAC), analog-to-digital conversion (ADC), modulation, demodulation, encoding, decoding, encryption, decryption, and so forth. The radio processor 804 may be representative of a radio processor for the radio module 106 described with reference to FIG. 1, for example.

The mobile computing device 800 may comprise a memory 824 coupled to the radio processor 804. The memory 824 may be implemented using any of the computer-readable media described with reference to the memory 810. The memory 824 may be typically implemented as flash memory and synchronous dynamic random access memory (SDRAM). Although the memory 824 may be shown as being separate from the radio processor 804, some or all of the memory 824 may be included on the same IC as the radio processor 804.

The mobile computing device 800 may comprise a transceiver module 826 coupled to the radio processor 804. The transceiver module 826 may comprise one or more transceivers or radios, such as wireless transceivers 108 of mobile computing device 100, arranged to communicate using different types of protocols, communication ranges, operating power requirements, RF sub-bands, information types (e.g., voice or data), use scenarios, applications, and so forth. In various embodiments, the transceiver module 826 may comprise one or more transceivers arranged to support voice communications and/or data communications for the wireless network systems or protocols as previously described. In some embodiments, the transceiver module 826 may further comprise a Global Positioning System (GPS) transceiver to support position determination and/or location-based services.

The transceiver module 826 generally may be implemented using one or more chips as desired for a given implementation. Although the transceiver module 826 may be shown as being separate from and external to the radio processor 804 for purposes of illustration, it is worthy to note that in various embodiments some portion or the entire transceiver module 826 may be included on the same integrated circuit as the radio processor 804. The embodiments are not limited in this context.

The mobile computing device 800 may comprise an antenna system 828 for transmitting and/or receiving electrical signals. As shown, the antenna system 828 may be coupled to the radio processor 804 through the transceiver module 826. The antenna system 828 may comprise or be implemented as one or more internal antennas and/or external antennas, such as antenna 112 of mobile computing device 110.

The mobile computing device 800 may comprise a subscriber identity module (SIM) 830 coupled to the radio processor 804. The SIM 830 may comprise, for example, a removable or non-removable smart card arranged to encrypt voice and data transmissions and to store user-specific data for allowing a voice or data communications network to identify and authenticate the user. The SIM 830 also may store data such as personal settings specific to the user. In some embodiments, the SIM 830 may be implemented as an UMTS universal SIM (USIM) card, a CDMA removable user identity module (RUIM) card, a universal integrated circuit card (UICC), smart card, and so forth. The SIM 830 may comprise a SIM application toolkit (STK) 832 comprising a set of programmed commands for enabling the SIM 830 to perform various functions. In some cases, the STK 832 may be arranged to enable the SIM 830 to independently control various aspects of the mobile computing device 800.

As mentioned above, the host processor 802 may be arranged to provide processing or computing resources to the mobile computing device 800. For example, the host processor 802 may be responsible for executing various software programs including system programs such as operating system (OS) 834 and application programs 836. System programs generally may assist in the running of the mobile computing device 800 and may be directly responsible for controlling, integrating, and managing the individual hardware components of the computer system. The OS 834 may be implemented, for example, as a Palm WebOS®, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 800 may comprise other system programs such as device drivers, programming tools, utility programs, software libraries, application programming interfaces (APIs), and so forth.

Application programs 836 generally may allow a user to accomplish one or more specific tasks. In various implementations, the application programs 836 may provide one or more graphical user interfaces (GUIs) to communicate information between the mobile computing device 800 and a user. In some embodiments, application programs 836 may comprise upper layer programs running on top of the OS 834 of the host processor 802 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 836 may include, without limitation, message applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Message applications may be arranged to communicate various types of messages in a variety of formats. Examples of message applications may include without limitation a cellular telephone application, a Voice over Internet Protocol (VoIP) application, a Push-to-Talk (PTT) application, a voicemail application, a facsimile application, a video teleconferencing application, an IM application, an email application, an SMS application, an MMS application, and so forth. It is also to be appreciated that the mobile computing device 800 may implement other types of applications in accordance with the described embodiments.

The host processor 802 may include the data service manager 104 and the application program 105-*p* in some embodiments, as described with reference to FIG. 1, for example.

The mobile computing device 800 may include various databases implemented in the memory 810. For example, the mobile computing device 800 may include a message content database 838, a message log database 840, a contacts database 842, a media database 844, a preferences database 846, and so forth. The message content database 838 may be arranged to store content and attachments (e.g., media objects) for various types of messages sent and received by one or more message applications. The message log 840 may be arranged to track various types of messages which are sent and received by one or more message applications. The contacts database 842 may be arranged to store contact records for individuals or entities specified by the user of the mobile computing device 800. The media database 844 may be arranged to store various types of media content such as image information, audio information, video information, and/or other data. The preferences database 846 may be arranged to store various settings such as rules and parameters for controlling the operation of the mobile computing device 800.

In some cases, various embodiments may be implemented as an article of manufacture. The article of manufacture may include a computer readable storage medium arranged to store logic, instructions and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
a radio arranged to communicate information over a wireless link;
a link classifier arranged to generate a class parameter for the wireless link based on signal quality measurements of the wireless link; and
a data service manager arranged to receive a data service request from an application, receive a data rate parameter associated with the application, the data rate parameter comprises an amount of bandwidth for communicating information over the wireless link, compare the class parameter for the wireless link with a value representing the application to determine whether to grant or deny the data service request, when the data service request would be granted based on the comparison, determine whether the application may communicate information over the wireless link at the data rate parameter based on the class parameter for the wireless link, and generate a control directive for the application granting or denying the data service request at the data rate parameter.

2. The mobile computing device of claim 1, the data service manager arranged to determine whether the application may communicate information over the wireless link at a modified data rate parameter when the application may not communicate information over the wireless link at a data rate parameter, and generate a control directive for the application granting or denying the data service request at the data rate parameter.

3. The mobile computing device of claim 1, the data service manager arranged to determine whether the application may communicate information over the wireless link at a modified data rate parameter when the application may not communicate information over the wireless link at a data rate parameter, with the modified data rate parameter lower than the data rate parameter, and generate a control directive for the application granting the data service request at the modified data rate parameter without the mobile computing device entering a power save mode.

4. The mobile computing device of claim 1, the data service manager arranged to determine an override condition associated with the data service request, and generate a control directive for the application granting or denying the data service request.

5. The mobile computing device of claim 4, the override condition comprising determining a priority level for the application.

6. The mobile computing device of claim 4, the override condition comprising determining the application was initiated by a user control directive.

7. The mobile computing device of claim 4, the override condition comprising determining the application is a voice over packet application.

8. The mobile computing device of claim 1, the link classifier arranged to measure one or more communication parameters for the wireless link including a transmission quality parameter, a communication protocol parameter, a modulation and coding parameter, a radio parameter, or performance history parameter.

9. The mobile computing device of claim 1, comprising a battery to supply power to the radio, and a power manager to measure an available power parameter for the battery.

10. The mobile computing device of claim 9, the data service manager arranged to determine whether the application may communicate information over the wireless link based on the class parameter for the wireless link and the available power parameter for the battery, and generate a control directive for the application granting or denying the data service request.

11. A method, comprising:
receiving a class parameter for a wireless link;
receiving a data service request from an application;

receiving a data rate parameter, the data rate parameter comprises an amount of bandwidth for communicating information over the wireless link;

comparing the class parameter for the wireless link with a value representing the application to determine whether to grant or deny the data service request;

determining whether the application may communicate information over the wireless link at the data rate parameter based on the class parameter for the wireless link when the data service request would be granted based on the comparison; and generating a control directive for the application granting or denying the data service request at the data rate parameter.

12. The method of claim 11, comprising determining whether the application may communicate information over the wireless link at a modified data rate parameter when the application may not communicate information over the wireless link at a data rate parameter.

13. The method of claim 11, comprising generating a control directive for the application granting or denying the data service request when an override condition is determined.

14. The method of claim 11, comprising determining whether the application may communicate information over the wireless link based on the class parameter for the wireless link and an available power parameter for a battery.

15. An article of manufacture comprising a non-tangible computer-readable storage medium containing instructions that when executed by a processor enable a system to monitor a wireless link, determine signal quality for the wireless link based on one or more communication parameters for the wireless link, generate a class parameter for the wireless link based on the determined signal quality for the wireless link, receive a data rate parameter for the application, the data rate parameter comprises an amount of bandwidth for communicating information over the wireless link, compare the class parameter for the wireless link with a value representing the application to determine whether to grant or deny a data service request for the application, and schedule operations of a radio based on the data rate parameter when the data service request would be granted based on the comparison.

16. The article of manufacture of claim 15, further comprising instructions that when executed by the processor enable the system to send the class parameter to a data service manager.

17. The article of manufacture of claim 15, further comprising instructions that when executed by the processor enable the system to receive a modified data rate parameter for the application, and schedule operations of a radio based on the modified data rate parameter.

* * * * *